United States Patent Office 3,695,832
Patented Oct. 3, 1972

3,695,832
PROCESS FOR REDUCING THE THIOUREA AND SULFATE CONTENT OF ALKALI AND ALKALINE EARTH-METAL RHODANIDES
Hans-Dieter Rupp, Mozartstr. 1, Erlenbach, Germany; and Gerhard Meyer, Blumenstr. 26; and Helmut Magerlein, Blumenstr. 40, both of Obernburg, Germany
No Drawing. Filed Nov. 15, 1971, Ser. No. 199,029
Claims priority, application Germany, Nov. 20, 1970, P 20 56 995.3
Int. Cl. C01c 3/20; C07c 157/00
U.S. Cl. 423—366                    10 Claims

ABSTRACT OF THE DISCLOSURE

The process for reducing the content of both thiourea and the sulfate ion in a crude alkali or alkaline earth-metal rhodanide wherein the impure or crude rhodanide is heated in an aqueous solution at elevated pressures and temperatures while maintaining the molar ratio of thiourea:sulfate of the initial aqueous solution at a value of at least 3:1, thereby converting both thiourea and sulfate ion into gaseous reaction products and sulfur which are then separated or given off from the reaction mixture. The remaining liquid solution is concentrated, filtered and cooled for separation of a purified rhodanide, and the resulting mother liquor is preferably recycled for combination with fresh crude rhodanide.

---

Ammonium rhodanide which has been produced by the reaction of ammonia and carbon disulfide or from hydrocyanic acid is always contaminated with thiourea. When re-salting the ammonium rhodanide into alkali or alkaline earth-metal rhodanide, with an alkali or alkaline earth metal hydroxide or oxide or carbonate, the thiourea is again found as an impurity in the rhodanide solution or in the solid alkali or alkaline earth-metal rhodanide after evaporation and crystallization of the solution. For example, technical sodium rhodanide may contain about 0.2% by weight of thiourea. Since it is quite common for technical reasons to obtain a very pure rhodanide, especially in the production of sodium rhodanide and with particular regard to sulfur-containing impurities, it is considered essential to separate and remove the thiourea.

According to one known process, a sodium rhodanide solution containing thiourea as an impurity is reacted with hydrogen peroxide. In this case, the thiourea reacts to form urea and sulfuric acid, this latter compound after neutralization with a caustic soda solution being precipitated and isolated by addition of barium rhodanide to form an easily filterable barium sulfate. However, on the other hand, the urea remains in the sodium rhodanide solution or in the solid sodium rhodanide as an impurity which is quite difficult to remove. Therefore, in this known process, one can obtain a sodium rhodanide which contains very little of the original thiourea impurity but not a pure sodium rhodanide since it still contains substantial amounts of urea as a still undesirable impurity.

A suitable process for the reduction or substantial removal of thiourea from these alkali and alkaline earth-metal rhodanides has been disclosed in our earlier copending application, Ser. No. 68,764, filed Sept. 1, 1970, according to which an aqueous solution of a thiourea-containing alkali or alkaline earth-metal rhodanide is heated under elevated pressures and at temperatures in the range of about 170–200° C. It was found that the thiourea hydrolyzes, i.e. reacts with water, to form hydrogen sulfide, ammonia and carbon dioxide as gaseous reaction products according to the following equation:

(I)     $SC(NH_2)_2 + 2H_2O \rightarrow H_2S + 2NH_3 + CO_2$

The minimum pressure for this reaction actually corresponds to the saturation pressure of the employed rhodanide solution at the particular reaction temperature. After heating for a relatively short period of time sufficient to decompose the thiourea into gaseous reaction products, the pressure can be released whereby the dissolved gaseous products of the hydrolysis are driven off from the solution. This process may also be carried out continuously by conducting the initial crude rhodanide solution through a tubular reactor heated to the reaction temperature, after which the pressure on the solution is released and the gaseous products separated. With this previously disclosed process, which is incorporated herein by reference, it is possible to obtain the desired product such as the sodium, potassium, calcium or barium rhodanide in a form which is substantially free of thiourea.

In addition to thiourea, however, solutions of a technical or crude rhodanide always contain sulfate as an additional undesirable impurity. This term "sulfate" is employed herein to refer to the divalent sulfate ion $SO_4^{\ominus\ominus}$. The amount of thiourea and sulfate present as impurities in alkali or alkaline earth-metal rhodanide solutions is essentially dependent upon the method by which the rhodanide has been synthesized, i.e. the ammonium rhodanide which is initially introduced for the production of the alkali and alkaline earth-metal rhodanide and also the sulfate content of the solution used to re-salt the ammonium rhodanide. In the synthesis of ammonium rhodanide from carbon disulfide and ammonia, reaction temperatures are normally employed which cause a portion of the resulting ammonium rhodanide to be thermally converted into thiourea. The alkali or alkaline earth-metal rhodanides which are produced from an ammonium rhodanide obtained in this manner generally show a higher content of thiourea than sulfate as impurities. On the other hand, the corresponding rhodanides obtained by re-salting an ammonium rhodanide which has been synthesized by reaction of hydrocyanic acid and ammonium polysulfide at lower temperatures, normally contain less thiourea than sulfate since the lower temperatures tend to prevent the thermal conversion of the reaction product into thiourea. Thus, an impure or technical alkali or alkaline earth-metal rhodanide may contain very different amounts of thiourea and sulfate as impurities.

It is a primary object of the present invention to provide a process for removing sulfur-containing impurities, particularly thiourea and sulfate, from a crude alkali or alkaline earth metal rhodanide as obtained by conventional processes. Another object of the invention is to provide an especially favorable continuous process for the purpose of substantially reducing the content of both thiourea and sulfate from a technical or crude alkali or alkaline earth metal rhodanide. Other objects and advantages of the invention will become more apparent upon consideration of the following detailed specification.

It has now been found, in accordance with the present invention, that in carrying out the treatment of the crude or impure alkali or alkaline earth-metal rhodanide in aqueous solution by heating the solution to a temperature of between about 170° C. and 200° C. under an elevated pressure, i.e. in the liquid phase of the solution and preferably in a continuous process, one can remove or substantially reduce both the thiourea and the sulfate content provided that the molar ratio of thiourea:sulfate of the aqueous solution to be heated is maintained at a value of at least 3:1. After this initial heat treatment, the pressure on the solution is released or reduced and the gaseous decomposition products are withdrawn. Then, the solution is preferably concentrated, filtered and cooled so as to crystallize or precipitate and separate a purified rhodanide from the solution, the remaining mother liquor obtained after this separation being returned to be combined with fresh crude rhodanide. This recycle of the mother liquor is particularly suitable in a continuous process since under the conditions of this invention, one can surprisingly obtain a very low sulfate concentration in the final product while also avoiding any build-up of sulfate in the operating system of the process.

The process of the invention is especially applicable to the purification of the crude or technical rhodanides of sodium, potassium, calcium or barium, for example as obtained in any conventional process and especially those processes carried out on an industrial level for the synthesis of ammonium rhodanide which is then re-salted to one of the desired alkali or alkaline earth metal rhodanide. It will be understood, of course, that the crude rhodanide treated according to the present invention is one which may contain other impurities in addition to the thiourea and sulfate content which represents the essential components to be removed or very substantially reduced in the final rhodanide product.

In general, it is desirable to maintain the thiourea:sulfate molar ratio at the beginning of the heat treatment above a value of 3:1 and especially to provide a molar ratio of approximately 5:1 for reasons set forth hereinafter. A greater excess of thiourea may be present, but it has been found advisable to work in a range of about 3:1 to 10:1, preferably about 4:1 to 7:1. At the same time, it has been found that especially good results are achieved if the sulfate concentration in the initial crude rhodanide solution is maintained in a range of about 50 to 1000 p.p.m., preferably about 100 to 300 p.p.m., with reference to the total amount of the crude rhodanide solution. These values are especially applicable to a continuous process where it has also been found most suitable to work with a thiourea concentration in the initial solution of up to about 1500 p.p.m. and usually more than 150 p.p.m.

Under the prescribed conditions of the invention, there takes place not only a hydrolysis of the thiourea in accordance with Equation I above but also a reaction between thiourea and the sulfate ion, probably according to the equation:

(II) $3SC(NH_2)_2 + SO_4^{\ominus\ominus} + 4H_2O \rightarrow$ 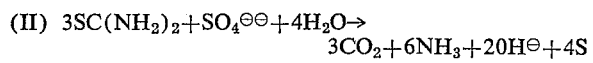
$3CO_2 + 6NH_3 + 20H^{\ominus} + 4S$ This means that there is a formation of sulfur together with a decrease of the sulfate ion concentration. It has been determined that the hydrogen sulfide formed by the hydrolysis of the thiourea has participated in this conversion of both thiourea and sulfate into gaseous reaction products and sulfur together with hydroxide ions. Equation II also indicates why it is essential to employ a molar ratio of thiourea:sulfate of at least 3:1, this representing the theoretical or stoichiometric ratio of the reaction. Under the prescribed reaction conditions, the alkali or alkaline earth metal rhodanides (i.e. sodium, potassium, calcium and barium rhodanides or mixtures thereof) are not decomposed and are readily crystallized and separated in a subsequent step substantially free of sulfur-containing impurities.

As in the process disclosed in our copending application, Ser. No. 68,764, it is advisable to carry out the heating step within the range of about 170 to 200° C. The hydrolysis of thiourea ordinarily begins at about 160° C. and proceeds at a satisfactory reaction speed at about 170° C. One should not exceed a temperature of 200° C. because the rhodanides tend to decompose above this temperature. Also, the reaction of thiourea with the sulfate ion proceeds in the process of the present invention at a satisfactory rate of speed within this same temperature range. It is especially preferred to use a reaction temperature of about 185 to 195° C.

Since the process according to the invention is carried out with an aqueous solution, it is necessary to work under an elevated pressure in order to achieve the desired reaction temperature of 170–200° C. In general, the pressures required for carrying out the process of the invention are dependent upon the concentration of the initial aqueous solution of the crude alkali or alkaline earth metal rhodanide and also to a lesser degree upon the content of thiourea and sulfate contained in this initial solution since these impurities also lead to a certain amount of gaseous reaction products. The minimum pressure required for the process naturally corresponds to the saturation pressure of the employed rhodanide solution at the particular reaction temperature. A few of these values of the saturation pressure have been set forth in the following table by way of example:

TABLE I

| Temp. (° C.) | Rhodanide | Concentration of the solution (percent by weight) | Saturation pressure, kg./cm.² (gauge) [1] |
|---|---|---|---|
| 170 | NaSCN | 30 | 5.2 |
| 180 | NaSCN | 30 | 6.5 |
| 190 | NaSCN | 30 | 8.2 |
| 170 | NaSCN | 57 | 3.2 |
| 180 | NaSCN | 57 | 4.2 |
| 190 | NaSCN | 57 | 5.0 |
| 170 | Ca(SCN)₂ | 30 | 5.7 |
| 180 | Ca(SCN)₂ | 30 | 7.5 |
| 190 | Ca(SCN)₂ | 30 | 9.8 |
| 170 | Ba(SCN)₂ | 30 | 6.75 |
| 180 | Ba(SCN)₂ | 30 | 8.8 |
| 190 | Ba(SCN)₂ | 30 | 11.4 |

[1] All numerical values for the saturation pressure are set forth herein as an atmospheric excess pressure, i.e. the pressure above one atmosphere measured in kg./cm.², commonly referred to as the guage pressure.

For economical reasons it is of course desirable to carry out the inventive process at a pressure which lies only slightly above this minimum pressure corresponding to the saturation pressure of a particular rhodanide solution in water. However, higher pressures can also be used without any substantial disadvantage other than the increased cost of operating at such higher pressures.

For the decomposition of the thiourea and the maximum reduction of the sulfate ion concentration under the reaction conditions, a heating period of about 15 minutes is generally sufficient. It has been found to be especially advantageous not to exceed a heating period of about 45 minutes. These represent preferred conditions which may be varied slightly when feasible, depending upon the amount of impurities and reaction speed, with the understanding that the reaction can be expected to require at least a few minutes up to about one hour. In a continuous operation, the mean residence time is preferably about 10 to 20 minutes, i.e. approximately 15 minutes.

The rhodanide solutions employed in the process of the invention can be used in very broad concentrations, including very slight concentrations. If the initial impure alkali or alkaline earth metal rhodanide containing the thiourea is a solid material, it is preferable to achieve the highest possible concentration of the aqueous solution and then treat this concentrated solution of the rhodanide by heating under pressure in accordance with the invention. On the other hand, it is also quite suitable to employ those aqueous solutions which are obtained in the conventional technical production of alkali and alkaline earth metal rhodanides, these solutions generally exhibiting a content of approximately 30 to 50% by weight of the rhodanide.

Under otherwise the same reaction conditions, the decrease of the sulfate ion concentration is dependent upon the molar ratio of thiourea to sulfate. Table II which follows gives a few examples of the extent to which the sulfate is removed in a series of experiments in which a 30% by weight sodium rhodanide solution has been heated at 190° C. The initial rhodanide solution always contained 100 p.p.m. of sodium sulfate as one impurity while varying the amount of thiourea as the other impurity.

TABLE II

| Thiourea, p.p.m. | Molar ratio, thiourea: sulfate | Reduction of $SO^{--}$ content in percent |
|---|---|---|
| 79 | 1:1 | 11 |
| 158 | 2:1 | 25 |
| 238 | 3:1 | 36 |
| 316 | 4:1 | 36 |
| 554 | 7:1 | 36 |

As will be apparent from Table II, the maximum reduction of the sulfate ion concentration is thus achieved at a molar ratio of thiourea to sulfate of about 3:1. Also, a larger excess of the thiourea, for example a 10 to 20 times molar excess, would not be disadvantageous in terms of reducing the content or concentration of the sulfate ion.

The decrease of the sulfate concentration is also dependent upon the sulfate concentration in the rhodanide solution. A few test results are further illustrated in Table III in order to demonstrate this fact. These tests were also conducted with a 30% by weight sodium rhodanide solution in which the thiourea and sulfate were always maintained in the same molar ratio of 3:1. However, each test was carried out at a different absolute concentration of the sulfate ion. The results of these tests show that even though the percentage reduction of sulfate declines with increasing initial sulfate concentration in the rhodanide solution, the absolute amount of the sulfate reduction actually increases.

TABLE III

| Sulfate concentration (p.p.m.): | Reduction of sulfate concentration (percent) |
|---|---|
| 100 | 36 |
| 300 | 25 |
| 700 | 21 |
| 900 | 18 |
| 1800 | 2–4 |

For the process of the invention, this means that a filtrate relatively rich in sulfate is obtained after concentration of the solution by evaporation up to about half of its original volume and separation of the sulfate-free rhodanide precipitate which has been crystallized. However, this sulfate ion concentration does not increase any further when the filtrate is recirculated or recycled, since the reaction or heat treatment reduces the sulfate ion concentration in the same or corresponding amount. In accordance with the invention, it has been found that one can regulate a constant sulfate ion concentration in the heated rhodanide solution and in the concentrated filtrate depending upon the particular reaction conditions. Moreover, these conditions can be controlled in such a manner as to substantially remove all of the thiourea while also reducing the sulfate ion concentration in the purified product to a very minimal amount.

For the process according to the invention, this means that a filtrate relatively rich in sulfate ions is obtained after concentration of the solution by evaporation up to about one-half of its original volume and separation of the sulfate-free rhodanide crystallizate. However, though recirculation as in a continuous process, the filtrate does not further increase its concentration in sulfate ions because the sulfate content is reduced during the heat treatment by a corresponding amount. Accordingly, a constant sulfate ion concentration depending upon the appropriate process conditions is achieved in both the initial rhodanide solution to be heated and in the concentrated filtrate.

It is thus a special advantage of the invention that both the thiourea and sulfate impurities can be reduced or substantially removed in a continuous procedure wherein it is necessary to recycle only the concentrated filtrate as mother liquor for combination with fresh crude rhodanide solution. It is also feasible, of course, to again dilute this concentrated filtrate before or during its recycle, for example by adding wash water obtained in washing the crystalline rhodanide product. Other variations are also feasible without departing from the spirit or scope of the invention, e.g. by using some semi-continuous or even batch steps as in evaporation or crystallization procedures. In all cases, however, it is especially advantageous to carry out the heat treatment of the crude rhodanide in aqueous solution in a continuous manner and preferably in the liquid phase. Also, by maintaining the sulfate impurity in closed circulation, an equilibrium is reached which ensures a substantial removal of all sulfate as well as the thiourea as undesirable sulfur-containing impurities.

In order to carry out the process of the invention under the best possible conditions, one first determines the content of thiourea and sulfate in the impure rhodanide solution. From these values, it is possible to calculate the amount of thiourea which must be added to the crude alkali or alkaline earth metal rhodanide in order to set up or regulate the necessary molar ratio of thiourea to sulfate. The values of Table III can be used as a first approximation in terms of the reduction of sulfate concentration. After several crystallizations have been accomplished, it is determined if a constant sulfate ion concentration has been established in the mother liquor. If this is not the case and the sulfate ion concentration has gradually increased, then the initial rhodanide solution must have proportionately greater amounts of thiourea added thereto until the sulfate ion concentration remains unchanged. In this way, one can quickly determine the optimum amount of thiourea to be added to the initial crude solution under any given conditions.

As a rule, the content of thiourea and sulfate impurities in technical alkali and alkaline earth metal rhodanides is subject only to slight variations when the particular rhodanide has been synthesized according to specific methods from raw materials of known composition. Therefore, the process of the invention is best adapted to a continuous rather than a discontinuous process. It has generally been found that the molar ratio of thiourea:sulfate for such a continuous process should be chosen as approximately 5:1, thereby providing some allowance for variations in the thiourea content. One can then avoid analytical controls over the process and still achieve very satisfactory results.

As previously noted, it is believed that hydrogen sulfide plays an important role in the reaction of the thiourea with sulfate. It has thus been proven that by maintaining the prescribed molar ratio of thiourea to sulfate, a marked reduction of the sulfate ion content occurs only if sufficient hydrogen sulfide is present in the aqueous reaction medium. It is therefore most favorable to carry out the process of the invention in an apparatus in which the hydrogen sulfide generated by the hydrolysis of the thiourea cannot even partly escape into a gas zone, e.g. as is the case when working in an autoclave, but instead remains completely within the liquid phase, i.e. the aqueous reaction solution. A tubular reactor of conventional construction has thus been found to be especially suitable so that one can work continuously in the liquid phase and conduct the heat treatment at the required elevated temperatures and pressures for a period of time sufficient to ensure a substantially complete reaction. It will be understood, of course, that other technically equivalent apparatus may also be used to maintain hydrogen sulfide in the liquid reaction medium during the entire reaction period.

The invention is further illustrated by the following example, all parts and percentages being by weight unless otherwise indicated. This is but one example and is not intended as the only method of carrying out the invention.

EXAMPLE

In this example, the initial or crude solution is a 30% sodium rhodanide solution in water which contains about 80 p.p.m. of thiourea and about 100 p.p.m. of sulfate ion (corresponding to a molar ratio of thiourea:sulfate of about 1:1) to which there has been added an additional 0.1% by weight of thiourea, with reference to the rhodanide solution.

This initial solution, as fresh material to be treated, is continuously introduced by means of a metering pump so as to be transported through a double-walled or jacketed reaction tube. This reaction tube has a length of 1500 mm. and an inner diameter of 25 mm. The tube is heated by indirect heat exchange so that the rhodanide solution is maintained at a temperature of 190–192° C. Into this heated reactor, there is introduced 3000 ml. per hour of the initial sodium rhodanide solution to be purified, i.e. corresponding to a mean residence time of about 15 minutes. By means of a suitable pressure maintenance valve, the pressure in the reactor is held at about 12 kg./cm.$^2$ gauge. The superheated and reacted sodium rhodanide solution is then continuously released into a receiver at about normal pressure where the reaction liquid comes to a boil and the gaseous reaction products are driven off and separated.

The remaining aqueous solution of sodium rhodanide separated from the gaseous products is then filtered and either continuously or discontinuously concentrated by evaporation to a density of 1.375 to 1.380 at $$\frac{20°}{4°} C.$$

Crystallization is then carried out at about 20° C. whereby there precipitates out about one-half of the total weight of the concentrated solution as a solid sodium rhodanide dihydrate. This precipitate is separated and then washed with a small amount of water, e.g. about 10 ml. H$_2$O per kg. of the precipitated salt.

The mother liquor and wash water are then combined with the same amount of the fresh crude sodium rhodanide solution as described above to which 0.1% by weight of thiourea has already been added. This combined liquor, water and solution is completely mixed and again conducted through the continuous hydrolysis or heating step for reaction of the impurities.

After several crystallizations and recirculation of the mother liquor, there is found a constant concentration of sulfate ion in this mother liquor of about 250 p.p.m., and the molar ratio of thiourea:sulfate in the solution entering the reaction tube is about 5:1.

The crystallized product, sodium rhodanide dihydrate, as obtained by this process is completely free of thiourea and sulfate.

COMPARATIVE EXAMPLE

Using the same crude sodium rhodanide solution containing 80 p.p.m. of thiourea and 100 p.p.m. of sulfate ion as in the preceding example but without adding the additional amount of thiourea, the process was again carried out in the same manner and under the same conditions to obtain the crystallized sodium rhodanide product. However, after several crystallizations with recirculation of the mother liquor, this recirculated solution became completely saturated with sulfate ions and the sodium rhodanide product being crystallized out had a content of about 90 p.p.m. of sulfate ions as the major impurity. No other conditions were found when working with this 1:1 molar ratio of thiourea:sulfate which would avoid the saturation of the mother liquor with sulfate or which would yield a rhodanide product free of sulfate.

The process of the invention can also be carried out with similar results by treating the potassium, calcium or barium rhodanides as well as the sodium rhodanide as initial crude or technical aqueous solutions. The source of the crude reactant is not important as long as its content of thiourea and sulfate is determined and then maintained at the prescribed thiourea:sulfate molar ratio, i.e. a ratio of at least 3:1. The process of the invention is thus equally applicable to those instances in which the sulfate content is either less or more than the thiourea content since only a very small amount of thiourea is required in any given instance to reach the prescribed thiourea:sulfate ratio. Even if the crude material were to possess a thiourea:sulfate molar ratio above 3:1, it is still necessary to maintain this ratio when recycling mother liquor, either by a sufficient reduction of sulfate content during the heating step and/or adding some additional thiourea to the initial crude rhodanide solution.

The process according to this invention is readily adapted to be carried out on a large commercial scale and with easily controlled steps and conditions permitting a very simple and economical purification. The purified alkali or alkaline earth metal rhodanide final product is obtained in this manner usually with no urea as an impurity, less than 5 p.p.m. of thiourea and in the range of 0 to 10 p.p.m. of sulfate. This represents a very highly purified rhodanide which has not been previously available on such a commercial scale.

The invention is hereby claimed as follows:

1. A process for reducing the content of thiourea and sulfate in a crude alkali or alkaline earth-metal rhodanide which comprises:
   heating an aqueous solution of said crude rhodanide under elevated pressure and at a temperature between about 170° C. and 200° C. while maintaining a molar ratio of thiourea:sulfate in the aqueous solution to be heated of at least 3:1;
   reducing the pressure and withdrawing gaseous decomposition products from the thus treated solution;
   then concentrating, filtering and cooling the solution to crystallize and separate therefrom a purified rhodanide; and
   returning the mother liquor obtained from said separation of the purified rhodanide to be combined with fresh crude rhodanide.

2. A process as claimed in claim 1 wherein the temperature for said heating is maintained at about 185° C. to 195° C.

3. A process as claimed in claim 1 wherein the molar ratio of thiourea:sulfate is maintained at approximately 5:1.

4. A process as claimed in claim 1 wherein said rhodanide is selected from the group consisting of sodium, potassium, calcium and barium rhodanides.

5. A process as claimed in claim 1 wherein elemental sulfur is filtered off from the heated solution after withdrawing the gaseous reaction products and prior to crystallization of the rhodanide.

6. A process as claimed in claim 1 wherein said crude rhodanide has been obtained by re-salting an ammonium rhodanide with an alkali or alkaline earth metal hydroxide or oxide or carbonate in aqeuous solution.

7. A process as claimed in claim 1 wherein the crude rhodanide being treated is approximately a 30 to 50% by weight aqueous solution.

8. A process as claimed in claim 1 wherein at least the steps of heating said aqueous solution of the crude rhodanide and withdrawing gaseous products therefrom, including the return of said mother liquor for combination with fresh crude rhodanide, are carried out continuously.

9. A process as claimed in claim 8 wherein the temperature for said heating is maintained at about 185° C. to 195° C.

10. A process as claimed in claim 8 wherein the molar ratio of thiourea:sulfate is maintained at approximately 5:1.

References Cited

UNITED STATES PATENTS

| 1,958,209 | 5/1934 | Scott | 23—75 |
| 2,894,815 | 7/1959 | Rolingson | 23—75 |

FOREIGN PATENTS

| 523,022 | 3/1956 | Canada | 23—75 |
| 400,916 | 1/1932 | Great Britain | 23—75 |

OSCAR R. VERTIZ, Primary Examiner

H. S. MILLER, Assistant Examiner

U.S. Cl. X.R.

260—552 R (5/69)

CERTIFICATE OF CORRECTION

Patent No. 3,695,832              Dated October 3, 1972

Inventor(s) Hans-Dieter Rupp et al

It is certified that error appears in the above-identified patent and that said Letters Patent are hereby corrected as shown below:

Column 1, after line 7, insert -- assignors to Glanzstoff AG, Wuppertal-Elberfeld, Germany --

Signed and sealed this 17th day of April 1973.

(SEAL)
Attest:

EDWARD M. FLETCHER, JR.               ROBERT GOTTSCHALK
Attesting Officer                     Commissioner of Patents